No. 842,019. PATENTED JAN. 22, 1907.
F. J. H. RUSTIGE.
AUTOMATIC CHECK VALVE FOR GAS AND LIQUID CONDUITS.
APPLICATION FILED JULY 17, 1905.

Fig. 1.

Fig. 2.

Witnesses.

Inventor
Frans J. H. Rustige
By
James L. Norris,
Atty.

UNITED STATES PATENT OFFICE.

FRANS JOHAN HENRIK RUSTIGE, OF STOCKHOLM, SWEDEN.

AUTOMATIC CHECK-VALVE FOR GAS AND LIQUID CONDUITS.

No. 842,019.   Specification of Letters Patent.   Patented Jan. 22, 1907.

Application filed July 17, 1905. Serial No. 270,035.

*To all whom it may concern:*

Be it known that I, FRANS JOHAN HENRIK RUSTIGE, mechanist, a citizen of Sweden, residing at 3 Fabriksgrand, Stockholm, Sweden, have invented new and useful Improvements in Automatic Check-Valves for Gas and Liquid Conduits, of which the following is a specification.

The present invention relates to a check-valve for gas and liquid conduits which is so constructed as to close automatically and shut off the supply of gas or liquid should the pipes between the said valve and the place of consumption, for instance, break or become injured. Such a valve is suitable, for instance, in illuminating apparatus where a liquid fuel is forced through a pipe to a burner to be there vaporized, the valve preventing the said fuel from flowing out in case of accidental breakage or intentional cutting of the pipe, and, moreover, if the vaporization for some reason or other should cease it will shut off the supply of fuel to the burner, and thus prevent smell and smoke arising from the latter.

In the accompanying drawings a conduit provided with the improved valve is illustrated, in Figure 1, in a side view and vertical section, and in Fig. 2 in a plan view.

The pipe $a$, leading from the reservoir for liquid or gas communicates with a chamber $c$ on one side of a diaphragm or flexible disk $d$, inclosed within a casing $l$. The said diaphragm carries on the other side a valve $f$, actuated by a spring $k$, tending to open the valve and to place a chamber $e$ at the other side of the diaphragm into communication with the continuation of the pipe $a$, represented in the drawings by a passage $g$, arranged in the wall of the casing $l$. The valve $f$ may, for instance, be provided with a hollow stem terminating at its inner end in the chamber $e$ and at its outer end in the passage just mentioned in the casing $l$. The valve (and consequently, also, the diaphragm $d$) can be pressed inward by hand, for instance, by the aid of a button $i$, located on a flexible diaphragm attached by means of a tight joint to the casing $l$, and on which diaphragm the valve $f$ bears with its outer end. The chamber $e$ communicates by means of one or more passages $h$ with the pipe leading to the place of consumption. Finally the part $b$ of the pipe $a$ situated between the inlets of the chambers $c$ and $e$ is so proportioned in length that a reduction of pressure in one chamber will not be noticeable in the other until after the elapse of a period sufficient for the reversal of the valve by the diaphragm.

If petroleum, for instance, be introduced into the pipe $a$, a portion thereof will first flow to the chamber $c$ and press on the diaphragm $d$ so as to force the valve $f$ down on its seat and close it. As a result no petroleum enters the chamber $e$, but the petroleum turned on will remain in the pipes $a$ $b$. If petroleum be supplied to the burner, the valve $f$ is forced inward by means of the button $i$, and the petroleum consequently flows through said valve into and fills the chamber $e$, pressing back the diaphragm $d$, so as to bring the valve $f$ into equilibrium, and petroleum now can pass through the chamber $e$ and the passage $h$ to the place of consumption.

Should the pipe between the latter and the chamber $e$ be cut off or the vaporization in the burner cease or other conditions occur by which the velocity of flow of the liquid in this part of the conduit were increased before the consequent reduction of pressure has been communicated to the liquid flowing into the chamber $c$—i. e., if a difference of pressure should occur between the chambers $e$ and $c$—the valve $f$ will be instantaneously closed by the diaphragm, owing to the higher pressure in the chamber $c$. The flow of petroleum to the chamber $e$ consequently ceases, as well as to the place of consumption, until the button $i$ is pressed once more.

The object of the spring $k$ is only to facilitate the return of the diaphragm to its normal position, and consequently, according to its tension, to alter the sensitiveness of the diaphragm, and thus that of the valve. By proper selection of this spring and proportioning of the resistance-pipe $b$ the entire valve accordingly can be adjusted for any given capacity of flow.

Having now particularly described and ascertained the nature of my said invention and in what manner the same is to be performed, I declare that what I claim is—

1. An automatic check-valve for gas and liquid conduits comprising a casing, a diaphragm dividing said casing into separate chambers, an inlet for establishing communication between one of said chambers and a supply, a conduit for establishing communication between the other of said chambers and the supply, an outlet for said last-mentioned chamber, and a valve within one of said chambers for closing said conduit, said valve connected to the diaphragm and adapted to be shifted thereby when the pressure in the two chambers becomes different thereby closing the conduit and shutting off communication from the supply to the outlet.

2. An automatic check-valve for gas and liquid conduits comprising a casing, a diaphragm dividing said casing into separate chambers, one of said chambers communicating with a source of supply, an outlet for the other of said chambers, means for establishing communication between that chamber which communicates with the supply and with the other chamber having the outlet, and a valve arranged in that chamber having an outlet and connected to the diaphragm and adapted when the pressure in the two chambers becomes different to shut off the communication between the two chambers.

In testimony whereof I have signed my name to this specification in the presence of two subscribing witnesses.

FRANS JOHAN HENRIK RUSTIGE.

Witnesses:
J. R. MARKMAN,
AUGUTUS E. INGRAM.